(12) United States Patent
Watanabe et al.

(10) Patent No.: US 11,892,700 B2
(45) Date of Patent: Feb. 6, 2024

(54) OPTICAL FIBER UNIT AND OPTICAL FIBER CABLE

(71) Applicant: SUMITOMO ELECTRIC INDUSTRIES, LTD., Osaka (JP)

(72) Inventors: Akihisa Watanabe, Osaka (JP); Masakazu Takami, Osaka (JP); Fumiaki Sato, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/641,896

(22) PCT Filed: Sep. 11, 2020

(86) PCT No.: PCT/JP2020/034490
§ 371 (c)(1),
(2) Date: Mar. 10, 2022

(87) PCT Pub. No.: WO2021/049626
PCT Pub. Date: Mar. 18, 2021

(65) Prior Publication Data
US 2022/0326467 A1     Oct. 13, 2022

(30) Foreign Application Priority Data

Sep. 11, 2019  (JP) .................................. 2019-165268

(51) Int. Cl.
*G02B 6/44* (2006.01)

(52) U.S. Cl.
CPC .......... *G02B 6/4482* (2013.01); *G02B 6/441* (2013.01); *G02B 6/4403* (2013.01); *G02B 6/448* (2013.01)

(58) Field of Classification Search
CPC .... G02B 6/4482; G02B 6/4403; G02B 6/441; G02B 6/448
USPC .......................................................... 385/114
See application file for complete search history.

(56) References Cited

U.S. PATENT DOCUMENTS

| 5,165,003 A | 11/1992 | Carter |
| 8,768,127 B1 * | 7/2014 | Burnett .................. G02B 6/441 385/110 |
| 2006/0104580 A1 * | 5/2006 | Um ........................ G02B 6/441 385/100 |
| 2020/0409005 A1 | 12/2020 | Sato et al. |

FOREIGN PATENT DOCUMENTS

| EP | 3 470 900 A1 | 4/2019 | |
| EP | 3 742 212 A1 | 11/2020 | |
| GB | 2311383 A * | 9/1997 | .......... G02B 6/4411 |
| JP | H04-085314 U | 7/1992 | |
| JP | 2013-190641 A | 9/2013 | |
| JP | 2014-016529 A | 1/2014 | |
| JP | 2015-102581 A | 6/2015 | |
| WO | WO-2019/142841 A1 | 7/2019 | |
| WO | WO-2019142841 A1 * | 7/2019 | .......... G02B 6/4405 |

* cited by examiner

*Primary Examiner* — Jerry M Blevins
(74) *Attorney, Agent, or Firm* — Faegre Drinker Biddle & Reath LLP

(57) ABSTRACT

An optical fiber unit includes: an optical fiber ribbon in which a plurality of optical fibers are arranged in parallel and connected to each other; a colored bundle tape longitudinally wrapped around an optical fiber ribbon bundle in which a plurality of the optical fiber ribbons are stranded together; and a colored bundle yarn spirally wound around the optical fiber ribbon bundle and the bundle tape.

4 Claims, 4 Drawing Sheets

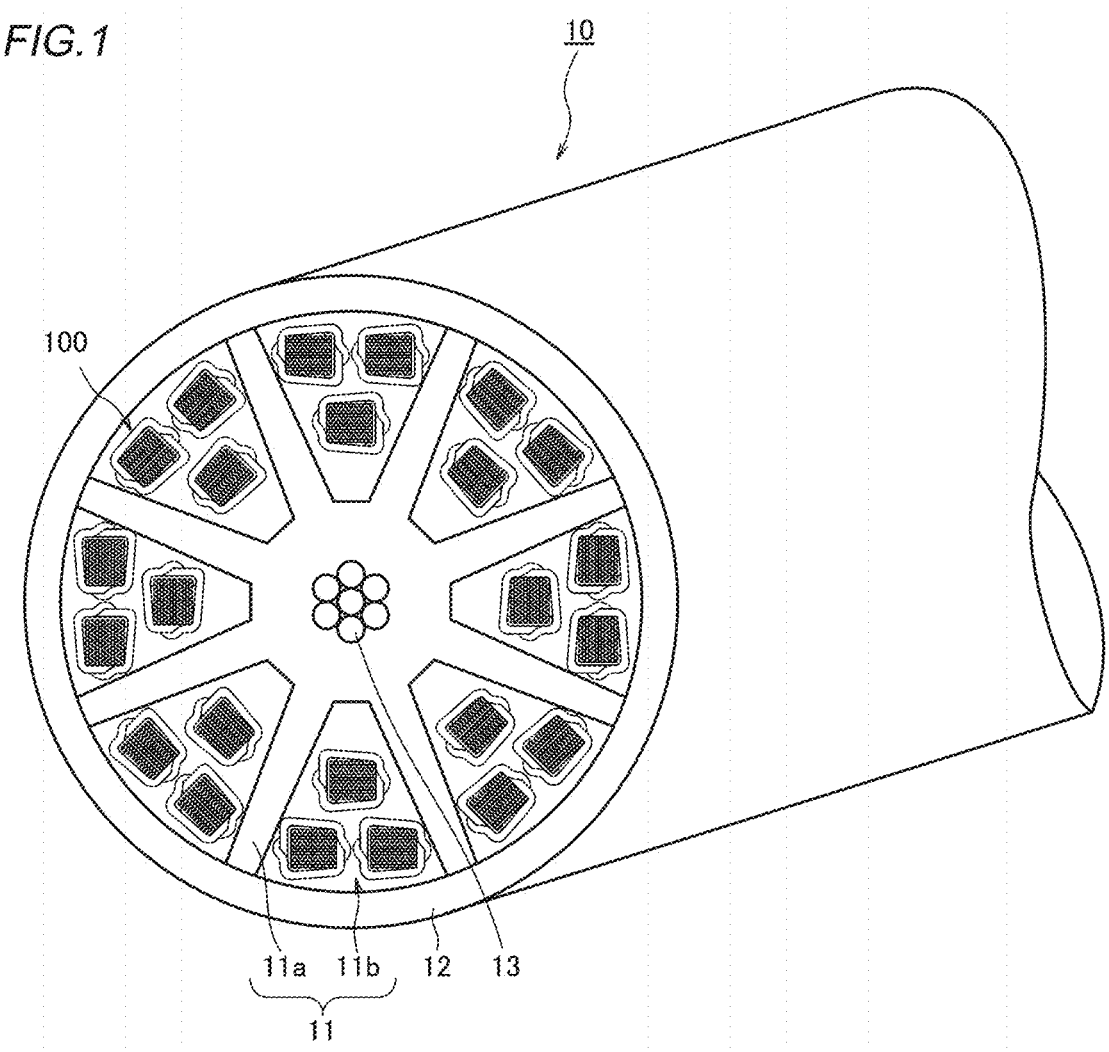

| CHARAC-TERISTICS \ TAPE WIDTH | $\frac{1}{8}\phi$ | $\frac{1}{4}\phi$ | $\frac{2}{4}\phi$ | $\frac{3}{4}\phi$ | $\frac{4}{4}\phi$ | $\frac{5}{4}\phi$ |
|---|---|---|---|---|---|---|
| IDENTIFIABILITY | − | + | + | + | + | + |
| MANUFACTURA-BILITY | − | + | + | + | + | − |

OPTICAL FIBER UNIT AND OPTICAL FIBER CABLE

TECHNICAL FIELD

The present disclosure relates to an optical fiber unit and an optical fiber cable.

This application is based upon and claims the benefit of priority from Japanese Patent Application No. 2019-165268, filed on Sep. 11, 2019, the entire contents of which are incorporated herein by reference.

BACKGROUND ART

In a related art, known is an optical fiber cable including an optical fiber unit including a plurality of optical fiber ribbons in which a plurality of optical fibers are arranged in parallel. In the above-described optical fiber cable, it is required to identify the respective optical fibers for wiring, and known is an optical fiber unit in which a bundle yarn for identification is wound around a bundle of optical fiber ribbons (for example, refer to JP-A-2013-190641 (Patent Literature 1)).

CITATION LIST

Patent Literature

Patent Literature 1: JP-A-2013-190641

SUMMARY OF INVENTION

An optical fiber unit according to one aspect of the present disclosure includes:

an optical fiber ribbon in which a plurality of optical fibers are arranged in parallel and connected to each other;

a colored bundle tape longitudinally wrapped around an optical fiber ribbon bundle in which a plurality of the optical fiber ribbons are stranded together; and a colored bundle yarn spirally wound around the optical fiber ribbon bundle and the bundle tape.

In an optical fiber cable according to one aspect of the present disclosure, a plurality of the optical fiber units are housed in a cable sheath.

BRIEF DESCRIPTION OF DRAWINGS

FIG. 1 is a cross-sectional view of an optical fiber cable according to an embodiment of the present disclosure.

DESCRIPTION OF EMBODIMENTS

Technical Problem

Figure 2A:
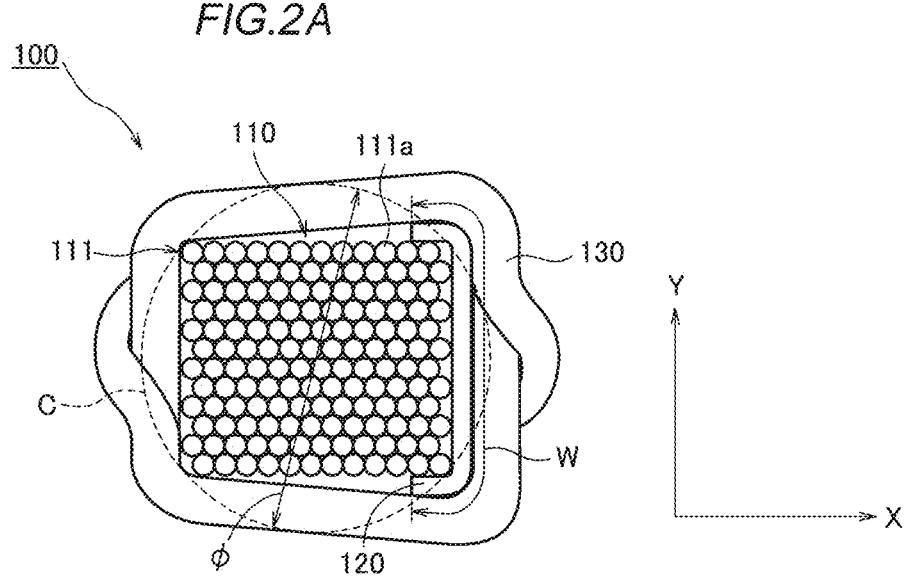
FIG. 2A is a cross-sectional view of an optical fiber unit according to the embodiment of the present disclosure.

In the optical fiber unit described in Patent Literature 1, two identification yarns are spirally wound around a bundle of the optical fiber. However, since only two identification yarns are provided, there is a risk that the optical fiber units cannot be sufficiently identified with each other in a high-density optical fiber cable exceeding 3,000 pieces.

The present disclosure has been made in consideration of the above-described circumstances, and an object thereof is to provide an optical fiber unit and an optical fiber cable excellent in identifiability.

Advantageous Effects of the Present Disclosure

According to the present disclosure, it is possible to provide an optical fiber unit and an optical fiber cable excellent in identifiability.

Description of Embodiments of the Present Disclosure

First, contents of the embodiments of the present disclosure will be listed and described.

(1) An optical fiber unit according to the present disclosure includes:

an optical fiber ribbon in which a plurality of optical fibers are arranged in parallel and connected to each other;

a colored bundle tape longitudinally wrapped around an optical fiber ribbon bundle in which a plurality of the optical fiber ribbons are stranded together; and a colored bundle yarn spirally wound around the optical fiber ribbon bundle and the bundle tape.

Since the bundle tape and the bundle yarn are colored in the optical fiber unit having the above-described configuration, the number of combinations of coloring with respect to the bundled tape and the bundled yarn is increased in comparison with a case where the optical fiber unit is identified only by a related-art bundled yarn. Therefore, it is possible to cope with identification of a large number of optical fiber units, such that identifiability of the optical fiber units can be improved.

(2) In the optical fiber unit, the bundle tape covers a whole periphery of the optical fiber ribbon bundle in a range of 25% or more and 100% or less.

As a result, a width of the bundle tape becomes a width to the extent that a color of the bundle tape can be visually recognized. Therefore, the identifiability of the optical fiber unit can be further improved while maintaining easiness of assembling the optical fiber unit.

(3) In the optical fiber unit, the bundle tape is a non-woven fabric.

As a result, air permeability between the optical fiber ribbon bundle and the bundle tape is secured. Therefore, it is possible to prevent moisture from being filled between the optical fiber ribbon and the optical fiber ribbon. A waterproof property can be secured by attaching water-absorption powder or the like to the bundle tape.

(4) In the optical fiber unit, the optical fiber ribbon is an intermittent ribbon including a connecting area in which the adjacent optical fibers are connected to each other and a non-connecting area in which the adjacent optical fibers are separated from each other.

As a result, the optical fiber ribbon exhibits flexibility and is easily bent in a connecting direction, such that the optical fiber unit is easily deformed. Therefore, even though the optical fiber units are assembled at a higher density, the optical fiber unit can be easily handled.

(5) In an optical fiber cable according to the present disclosure, a plurality of the optical fiber units according to any one of (1) to (4) are housed in a cable sheath.

The optical fiber cable having the above-described configuration includes an optical fiber unit excellent in identifiability. Therefore, a larger number of optical fiber units can be housed in an identifiable state compared to an optical fiber cable in which the optical fiber unit is identified only by a related-art bundle yarn.

Details of Embodiments of the Present Disclosure

Hereinafter, a specific cable structure of an optical fiber cable 10 according to an embodiment of the present disclosure will be described with reference to FIGS. 1 to 4.

In the following description, since a configuration denoted by the same reference sign even in a different drawing is regarded as the same configuration, the description thereof may be omitted. The scope of the present disclosure is not limited to these examples, but is indicated by the scope of the claims, and is intended to include all the modifications within the meaning equivalent to the scope of the claims and within the scope thereof.

Optical Fiber Cable

First, the specific cable structure of the optical fiber cable 10 will be described with reference to FIG. 1. As illustrated in FIG. 1, the optical fiber cable 10 includes a slot rod 11 including a plurality of ribs 11a, an optical fiber unit 100 disposed in a slot groove 11b formed between the rib 11a and a cable sheath 12 that covers the slot rod 11 and the optical fiber unit 100.

The rib 11a of the slot rod 11 protrudes in a radial direction from a central portion of the slot rod 11, and as illustrated in FIG. 1, eight ribs 11a are formed at an equal space in a circumferential direction. Therefore, in the embodiment, the slot rod 11 is formed with eight slot grooves 11b. The slot groove 11b is formed in a spiral shape along a longitudinal direction of the optical fiber cable 10, or is formed in an SZ shape so that a twisting direction is periodically reversed.

A tension member 13 is embedded in the central portion of the slot rod 11. As the tension member 13, a wire material having strength against tension and compression, for example, a steel wire, a fiber reinforced plastic (FRP), or the like are used.

Optical Fiber Unit

Next, the optical fiber unit 100 will be described with reference to FIGS. 2A and 2B.

The optical fiber unit 100 includes an optical fiber ribbon bundle 110, a bundle tape 120, and a plurality of bundle yarns 130.

The optical fiber ribbon bundle 110 is formed by stranding a plurality of flat optical fiber ribbons 111 in which a plurality of optical fibers 111a are arranged in parallel and connected to each other.

The bundle tape 120 is longitudinally wrapped in a longitudinal direction of the optical fiber ribbon bundle 110.

The plurality of bundle yarns 130 are spirally wound around the optical fiber ribbon bundle 110 and the bundle tape 120.

Figure 2B:
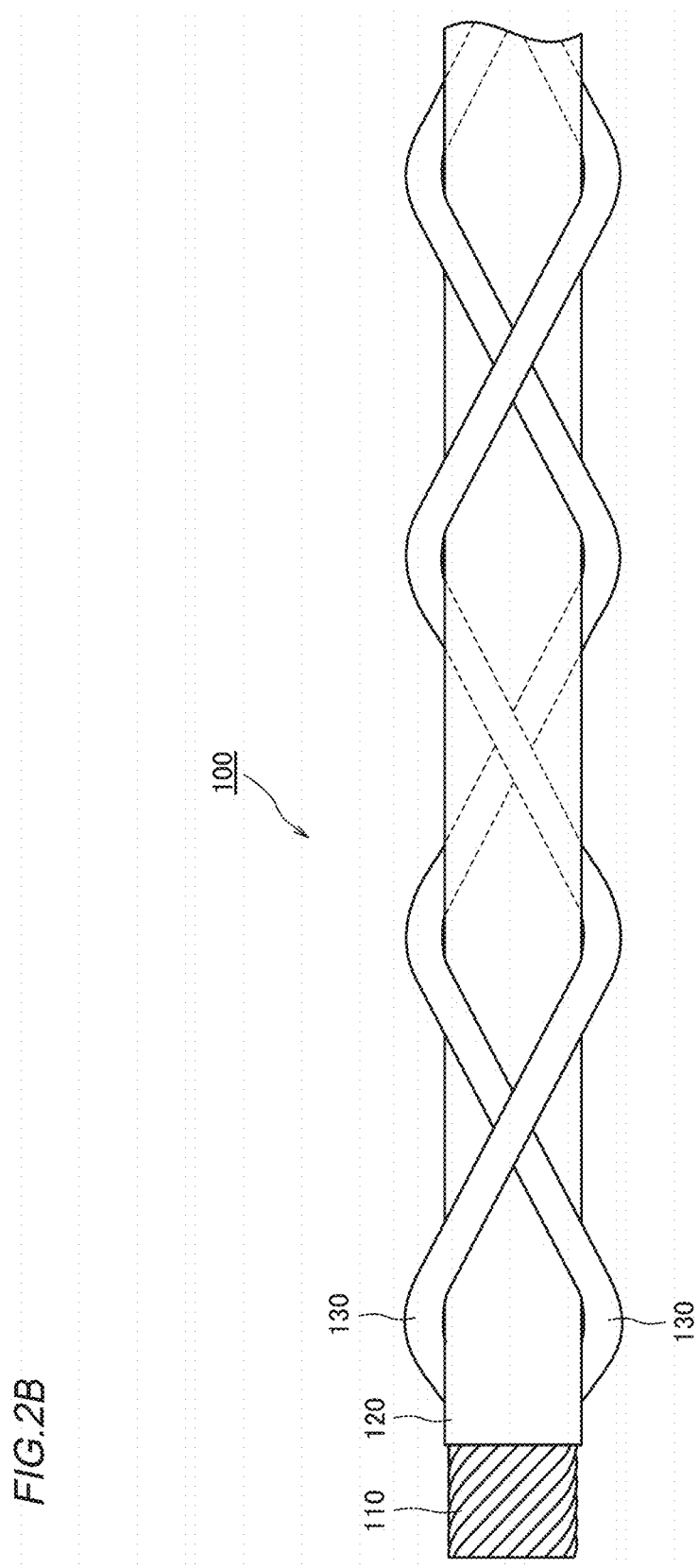
FIG. 2B is a side view of the optical fiber unit according to the embodiment of the present disclosure.

As illustrated in FIG. 2A, the optical fiber ribbon bundle 110 is formed by stacking the optical fiber ribbons 111 in a direction Y orthogonal to a parallel direction X of the optical fiber 111a, and, in the embodiment, 12 optical fiber ribbons 111 are stacked. For example, as illustrated in FIG. 2B, the optical fiber ribbon bundle 110 is stranded in Z strand (stranded in a left direction).

Figures 3, 4:
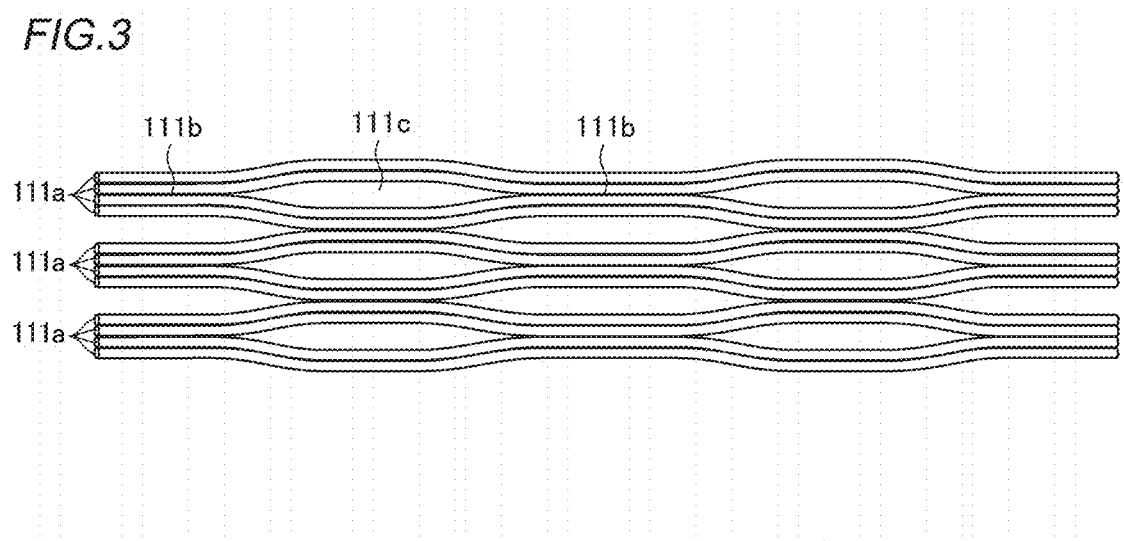
FIG. 3 is a plan view of an optical fiber ribbon.
FIG. 4 is a table showing a width of a bundle tape and a characteristic thereof.

As illustrated in FIG. 3, the optical fiber ribbon 111 is an intermittent ribbon including a connecting area 111b in which adjacent optical fibers 111a are connected to each other and a non-connecting area 111c in which adjacent optical fibers 111a are separated from each other. In the embodiment, the optical fiber ribbon 111 is formed of 12 optical fibers 111a. A diameter of the optical fiber 111a in the embodiment is about 0.25 mm.

The bundle tape 120 is formed of, for example, a colored nonwoven fabric, and has a thickness of, for example, about 0.03 mm to 0.2 mm. As illustrated in FIG. 2A, the bundle tape 120 covers a part of the optical fiber ribbon bundle 110.

A width W of the bundle tape 120 is determined in relation to an outer diameter φ of the optical fiber ribbon bundle 110. The "outer diameter φ of the optical fiber ribbon bundle 110" referred to herein is a diameter of a virtual circumscribed circle C of the optical fiber ribbon bundle 110.

Here, an optimum width of the width W of the bundle tape 120 will be examined. In the present disclosure, an evaluation of the width W of the bundle tape 120 is performed when the width W thereof is (1/8)×φ, (1/4)×φ, (2/4)×φ, (3/4)×φ, (4/4)×φ, and (5/4)×φ. In each case of the width W thereof, identifiability of the bundle tape (whether presence of the bundle tape is instantly noticed by looking at the optical fiber unit) and manufacturability (whether it is easy to assemble the optical fiber unit) are evaluated. With respect to the identifiability, when the presence of the bundle tape is instantly noticed by looking at the optical fiber unit, the identifiability is defined as "+", and when the presence of the bundle tape is not instantly noticed by looking at the optical fiber unit, the identifiability is defined as "−". With respect to the manufacturability, when it is easy to assemble the optical fiber unit, the manufacturability is defined as "+", and when the width of the bundle tape is too thin or too thick such that it is difficult to assemble the optical fiber unit, the manufacturability is defined as "−".

FIG. 4 illustrates a result of examining the optimum width of the width W of the bundle tape 120. As illustrated in FIG. 4, it can be seen that the width W of the bundle tape 120 is desirably 1/4 times (25%) or more of the outer diameter φ of the optical fiber ribbon bundle 110 from a viewpoint of the identifiability. When the width W of the bundle tape 120 is less than 1/4 times the outer diameter φ of the optical fiber ribbon bundle 110, the bundle tape 120 may be hidden behind the optical fiber unit 100, such that the bundle tape 120 cannot be identified.

From a viewpoint of the manufacturability, it can be seen that the width W of the bundle tape 120 is desirably 1/4 times (25%) or more and 4/4 times (100%) or less of the outer diameter φ of the optical fiber ribbon bundle 110. When the width W of the bundle tape 120 is less than 1/4 times the outer diameter φ of the optical fiber ribbon bundle 110, it becomes difficult to dispose the bundle tape 120 along the optical fiber ribbon bundle 110. It is difficult to manufacture the optical fiber unit 100 by allowing the width W of the bundle tape 120 to be greater than 4/4 times the outer diameter φ of the optical fiber ribbon bundle 110, that is, by, overlapping the bundle tapes 120.

Therefore, it is desirable that the bundle tape 120 covers the whole periphery of the optical fiber ribbon bundle 110 with 25% or more and 100% or less.

In the embodiment, there are two bundle yarns 130 which are spirally wound around the optical fiber ribbon bundle 110 in opposite directions. A diameter of the bundle yarn 130 in the embodiment is about 1 mm. The bundle yarn 130 is also colored in the same manner as that of the bundle tape 120, and may be colored with the same color as that of the bundle tape, or with a color different from that of the bundle tape.

In the optical fiber unit 100 according to the embodiment of the present disclosure obtained as described above, since the bundle tape 120 and the bundle yarn 130 are colored, the number of combinations of coloring with respect to the bundle tape 120 and the bundle yarn 130 increases compared to a case where the optical fiber unit is identified only by a related-art bundle yarn. Therefore, it is possible to cope with identification of a large number of optical fiber units 100, such that the identifiability of the optical fiber unit 100 can be improved.

The optical fiber cable 10 according to the embodiment of the present disclosure includes the optical fiber unit 100 having excellent identifiability. Therefore, a larger number of optical fiber units 100 can be housed in an identifiable state compared to an optical fiber cable in which the optical fiber unit is identified only by the related-art bundle yarn.

The bundle tape 120 covers the optical fiber ribbon bundle 110 in a range of 25% or more and 100% or less. As a result, the width W of the bundle tape 120 becomes a width to the extent that the color of the bundle tape 120 can be visually recognized. Therefore, the identifiability of the optical fiber unit 100 can be further improved while maintaining easiness of assembling the optical fiber unit 100.

The optical fiber ribbon 111 is an intermittent ribbon including the connecting area 111b in which the adjacent optical fibers 111a are connected to each other and the non-connecting area 111c in which the adjacent optical fibers 111a are separated from each other. As a result, the optical fiber ribbon 111 exhibits flexibility and is easily bent in a connecting direction, such that the optical fiber unit 100 is easily deformed. Therefore, even though the optical fiber units 100 are assembled at a higher density, the optical fiber unit 100 can be easily handled.

Modifications

While the embodiment of the present disclosure is described above, the present disclosure is not limited thereto. Respective elements provided in the above-described embodiment can be combined as long as technically possible, and a combination thereof is also included in the scope of the present disclosure as long as the combination thereof includes features of the present disclosure.

For example, the optical fiber cable of the embodiment has a structure including a slot rod, and may have a so-called "slotless" structure in which the optical fiber unit is housed inside the cable sheath without using the slot rod.

For example, the number of slot grooves in the slat rod is eight in the embodiment, and the number thereof is not limited thereto. A disposal position of the tension member in the slot rod is the center of the slot rod in the embodiment, and is not limited thereto. A plurality of number of tension members may be provided.

For example, in the embodiment, while the optical fiber ribbon bundle is formed of 12 optical fiber ribbons, the number of optical fiber ribbons is not limited thereto, and any number thereof may be provided as long as a plurality of optical fiber ribbons are provided.

In the embodiment, the optical fiber ribbon bundle is Z-stranded, and is not limited thereto. The optical fiber ribbon bundle may be, for example, S-stranded or SZ-stranded.

In the embodiment, while the optical fiber ribbon is formed of 12 optical fibers, the number of optical fibers is not limited thereto, and any number thereof may be provided as long as a plurality of optical fibers are provided.

In the embodiment, while specific numerical values are shown for the diameter of the optical fiber, the thickness of the bundle tape, and the diameter of the bundle yarn, these numerical values are merely examples and are not limited thereto. For example, in the embodiment, while the diameter of the optical fiber is about 0.25 mm, the diameter of the optical fiber is not limited thereto, and may be, for example, a smaller diameter of about 0.165 mm to about 0.22 mm.

REFERENCE SIGNS LIST

10: optical fiber cable
11: slot rod
11a: rib
11b: slot groove
12: cable sheath
13: tension member
100: optical fiber unit
110: optical fiber ribbon bundle
111: optical fiber ribbon
111a: optical fiber
111b: connecting area
111c: non-connecting area
120: bundle tape
130: bundle yarn
C: virtual circumscribed circle of optical fiber ribbon bundle
φ: outer diameter (whole periphery) of the optical fiber ribbon bundle
W: width of bundle tape
X: arrangement direction of optical fiber
Y: stacking direction of optical fiber ribbon

The invention claimed is:

1. An optical fiber unit, comprising:
an optical fiber ribbon in which a plurality of optical fibers are arranged in parallel and connected to each other;
a colored bundle tape longitudinally wrapped around an optical fiber ribbon bundle in which a plurality of the optical fiber ribbons are stranded together; and
a colored bundle yarn spirally wound around the optical fiber ribbon bundle and the bundle tape, wherein
the colored bundle tape covers a whole periphery of the optical fiber ribbon bundle in a range of 25% or more and 100% or less,
the colored bundle tape covers a given area of the optical fiber ribbon bundle, and
the given area is 50% or more and 100% or less of the entire circumference of the optical fiber ribbon bundle in a cross sectional view.

2. The optical fiber unit according to claim 1, wherein the bundle tape is a non-woven fabric.

3. The optical fiber unit according to claim 1, wherein the optical fiber ribbon is an intermittent ribbon including a connecting area in which the adjacent optical fibers are connected to each other and a non-connecting area in which the adjacent optical fibers are separated from each other.

4. An optical fiber cable in which a plurality of the optical fiber units according to claim 1 are housed in a cable sheath.

* * * * *